United States Patent
Li et al.

(10) Patent No.: US 8,996,009 B2
(45) Date of Patent: Mar. 31, 2015

(54) METHOD, SYSTEM AND DEVICE FOR TRANSMITTING HANDOVER INFORMATION

(71) Applicants: Haitao Li, Beijing (CN); Jing Liang, Beijing (CN)

(72) Inventors: Haitao Li, Beijing (CN); Jing Liang, Beijing (CN)

(*) Notice: Subject to any disclaimer, the term of this patent is extended or adjusted under 35 U.S.C. 154(b) by 8 days.

(21) Appl. No.: 13/691,749

(22) Filed: Dec. 1, 2012

(65) Prior Publication Data

US 2013/0183972 A1 Jul. 18, 2013

Related U.S. Application Data

(63) Continuation of application No. PCT/CN2011/073936, filed on May 11, 2011.

(51) Int. Cl.
*H04W 36/00* (2009.01)
*H04L 5/00* (2006.01)

(52) U.S. Cl.
CPC ...... *H04W 36/0061* (2013.01); *H04W 36/0005* (2013.01); *H04L 5/0007* (2013.01)
USPC ........................... 455/436; 455/438; 455/410

(58) Field of Classification Search
None
See application file for complete search history.

(56) References Cited

U.S. PATENT DOCUMENTS

| 6,400,951 | B1* | 6/2002 | Vaara | 455/436 |
| 2010/0075684 | A1* | 3/2010 | Iwamura et al. | 455/449 |
| 2011/0070880 | A1* | 3/2011 | Song et al. | 455/423 |
| 2013/0301439 | A1* | 11/2013 | Heo et al. | 370/252 |

FOREIGN PATENT DOCUMENTS

| CN | 101588610 | 11/2009 |
| CN | 101600237 | 12/2009 |
| CN | 101616459 | 12/2009 |
| CN | 101682877 | 3/2010 |

OTHER PUBLICATIONS

IPRP for related PCT/CN2011/073936 issued on Dec. 14, 2012.
ISR for related PCT/CN2011/073936 mailed on Aug. 18, 2011.
Written Opinion for related PCT/CN2011/073936 completed on Aug. 11, 2011.

* cited by examiner

*Primary Examiner* — Erika A Washington
(74) *Attorney, Agent, or Firm* — Ladas & Parry, LLP

(57) ABSTRACT

The present invention discloses method, system and equipment for transmitting handover information. The method comprises: source eNB sends handover request to target eNB, and distinguished the carried primary cell (Pcell) candidate set and secondary cell (Scell) candidate set through the identification information carried by said handover request. That carrying indication information of target eNB is used for selecting Pcell and Scell through handover request information during multicarrier handover is realized through the embodiments of the present invention.

15 Claims, 4 Drawing Sheets

METHOD, SYSTEM AND DEVICE FOR TRANSMITTING HANDOVER INFORMATION

CROSS REFERENCE TO RELATED APPLICATIONS

This application is a continuation of PCT/CN2011/073936 filed on May 11, 2011, which claims priority to Chinese Patent Application No. 201010205992.3 filed in the Patent Office of the People's Republic of China on Jun. 12, 2010, entitled "Method, System and Equipment For Transmitting Handover Information" the disclosures of which are hereby incorporated by reference in their entireties.

FIELD OF THE INVENTION

The present invention relates generally to the communication field, and more particularly to method, system and equipment for transmitting handover information.

BACKGROUND OF THE INVENTION

In LTE (Long Time Evolution) and previous wireless communication system, a cell only has a carrier; the max. Bandwidth in LTE system is 20 MHz, as shown in FIG. 1. Since LTE system is single-carrier system, source eNB only provides information of a cell to target eNB during handover judgment for accepting judgment of target side eNB.

In LTE-A (LTE Advanced) system, the peak rate is greatly improved compared with LTE, which is required to be 1 Gbp at downlink and 500 Mbps at uplink. Only using the carrier with maximum bandwidth of 20 MHz can hardly achieve the requirements of peak rate. Therefore, LTE-A system needs to expand the bandwidth available to terminal, thus the introduction of CA (Carrier Aggregation) technology, that is, aggregate several continuous or discontinuous carriers under the same eNB (evolved Node-B,) and serve UE (User Equipment), so as to provide the required rate; thus these aggregated carriers are also called CC (Component Carrier). Each cell can be a cell, and those cells (CCs) under different eNB cannot be aggregated. To ensure UE of LTE can be work under each aggregated carrier, each carrier cannot exceed 20 MHz at most. CA technology of LTE-A is shown in FIG. 2, where there are 4 carriers that can be aggregated under the eNB of LTE-A shown, and the eNB can perform data transmission on 4 carriers and UE simultaneously, to improve system throughput.

In LTE-A system, UE can be aggregated on multicarriers at the same time to carry out signalling scheduling and service transmission. Viewed from resource allocation, allocation of some uplink resource (including channel quality Indicator (CQI), dedicated scheduling request (DSR) and uplink HARQ feedback (ACK/NACK) have been restricted on certain uplink carrier in standard discussion at present and concept of primary component carrier (PCC) has been defined, viz. bind the restriction on three uplink resource allocations introduced by RAN1 on primary component carrier. Among multicarriers aggregated of UE, carriers other than primary component carrier are secondary component carrier (SCC). Primary component carrier is selected at UE level, viz. all UE of the system are not required to use the same primary component carrier. In addition, uplink and downlink carriers composing primary component carrier are required to meet corresponding relation indicated in system information SIB2. In carrier aggregation system, UE can aggregate multiple cells to work at the same time. In discussion regarding measurement at present, concept of Pcell and Scell is defined aiming to multiple cells with UE aggregated, which is corresponding respectively to primary component carrier (PCC) cell and secondary component carrier (SCC) cell the UE aggregated.

However, during multicarriers handover, when UE is switched from source eNB toward target eNB, corresponding solution of how source eNB carries indication information that target eNB selects Pcell cell and Scell during handover has not been provided in present technology.

SUMMARY OF THE INVENTION

The embodiments of the present invention provide method, system and equipment for transmitting handover information, thus, carrying the indication information that target eNB selects Pcell and Scell through handover information during multicarrier handover is realized.

The embodiments of the present invention provide a method for transmitting handover information, including:

Source eNB sends handover request to target eNB, and distinguishes the carried candidate set of primary cell (Pcell) and secondary cell (Scell) through the identification information carried by said handover request.

The embodiments of the present invention provide a method for transmitting handover information, including:

The target eNB receives the handover request sent by source eNB.

Said target eNB distinguishes Pcell candidate set and Scell candidate set through the identification information carried by said handover request.

The embodiments of the present invention provide an eNB, including:

Sending unit, which is used to send handover request to target eNB, and distinguish the carried Pcell candidate set and Scell candidate set through the identification information carried by said handover request.

The embodiments of the present invention provide an eNB, including:

Reception unit, is used to receive the handover request sent by source eNB.

Distinguishing unit, is used to distinguish Pcell candidate set and Scell candidate set through the identification information carried by said handover request.

The embodiments of the present invention provide a transmission system for handover information, including source eNB and target eNB; herein, Said source eNB is used to receive the measurement report submitted by user terminal, send handover request to said target eNB accordingly, and distinguish Pcell candidate set and Scell candidate set through the identification information carried by said handover request.

Said target eNB is used to receive the handover request sent by said source eNB, and distinguish Pcell candidate set and Scell candidate set through the identification information carried by said handover request.

Compared with the present technology, the embodiments of the present invention at least possess the following advantages:

The embodiments of the present invention provide a method of selecting indications of Pcell and Scell through handing over information-carried target eNB during multicarrier handover process, so as to enable the target cell to distinguish Pcell and Scell, and then select corresponding Pcell and Scell according to indications of source cell.

BRIEF DESCRIPTION OF THE DRAWINGS

To more clearly explain the technical proposal in the embodiments of the present invention or present technology, attached drawings required in the embodiments of the present invention or present technology description shall be simply introduced below. Obviously, drawings shown below are only some embodiments of the present invention, and for ordinary technicians of this field, they can also acquire other attached drawings based on these drawings on the premise of paying no creative work.

DETAILED DESCRIPTION OF THE EMBODIMENTS OF THE PRESENT INVENTION

Figure 1:
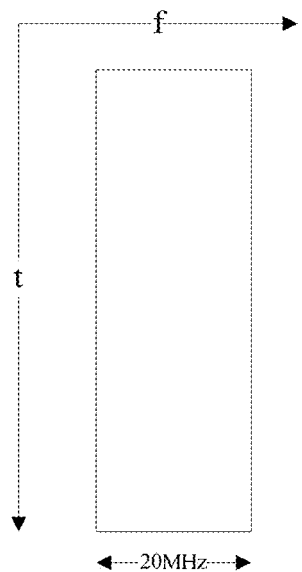
FIG. 1 is a structure diagram of the maximum bandwidth in LTE system of present technology.
Figure 2:
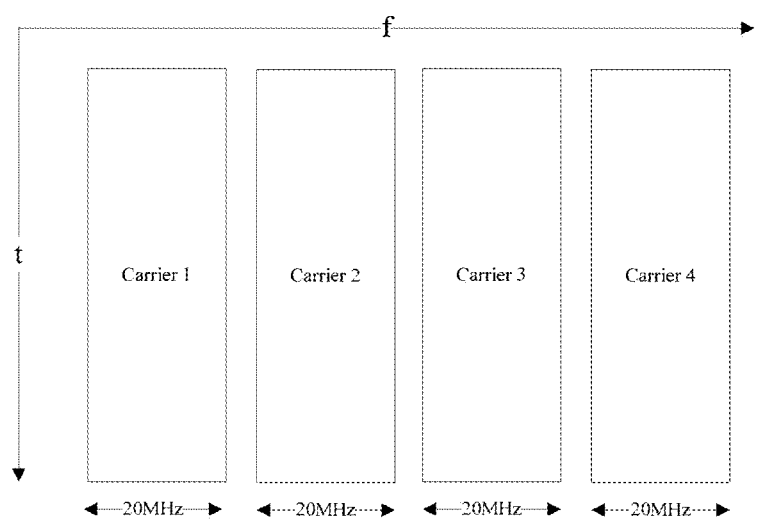
FIG. 2 is a structure diagram of CA technology of LTE-A in present technology.

To more clearly introduce the method for transmitting handover information provided in embodiments of the present invention, here handover process of LTE system shall be shown firstly.

Viewed from the number of participating nodes, handover of LTE system can be divided into 2 kinds, viz. intra-eNB handover and inter-eNB handover. Herein, intra-eNB handover may be the handover required for updating key parameter in consideration of safety. Considering interface type between source and target eNB, intra-eNB handover can also be divided into X2 handover and S1 handover that transfer message respectively by X2 and S1 interfaces, so message handed over by S1 will pass through MME (Mobility Management Entry) node.

Handover for UE in LTE system is that between single carrier cells since UE in LTE system works on single carrier. Generally, source eNB will choose proper cell based on UE measurement reporting to initiate handover request message to the eNB belonged; as for blind handover, reference to UE measurement reporting can be neglected for source eNB. While sending single cell handover request, source eNB carries a ReestablishmentInfo IE (information element) in container of RRC (Radio Resource Control) message, including identifier and security key that can reestablish cell and other information. Structure of IE of ReestablishmentInfo, viz. ReestablishmentInfo information element, is shown as below:

```
-- ASN1START
ReestablishmentInfo ::=            SEQUENCE {
    sourcePhysCellId              PhysCellId,
    targetCellShortMAC-I             ShortMAC-I,
    additionalReestabInfoList     AdditionalReestabInfoList
    OPTIONAL,
    ...
}
AdditionalReestabInfoList ::=     SEQUENCE ( SIZE
(1..maxReestabInfo) ) OF AdditionalReestabInfo
AdditionalReestabInfo ::=SEQUENCE{
    cellIdentity                  CellIdentity,
    key-eNodeB-Star               Key-eNodeB-Star,
    shortMAC-I                       ShortMAC-I
}
Key-eNodeB-Star ::=               BIT STRING (SIZE (256))
-- ASN1STOP
```

Since security key is attached to each cell can be reestablished in IE of reestablishment information, during X2 handover, target eNB can choose other cells in the reestablishment list based on its RRM algorithm for accept treatment after receiving handover request from source eNB. Cells accepted are sent to UE in mode of handover order through source eNB finally. While during S1 handover, replacement of handover cell of target eNB is unnecessary to be limited by cell security key provided by source eNB. Key during X2 handover is acquired upon calculation of source eNB and that during S1 handover is acquired upon calculation of target eNB.

Herein, detailed measurement mechanism of LTE system is:

eNB sends measurement configuration information to UE through RRC signalling and then UE conducts measurement according to contents of measurement configuration information (common frequency, pilot frequency and different technologies); then the measurement results will be submitted to network.

Herein, RRC connection reallocation process is adopted for measurement configuration of network. Organization structure of measurement configuration information includes:

Measurement object: taking frequency point as the basic unit, each measurement object configured is a single frequency point and owns independent measurement object identifier (ID);

Report configuration: divided into event triggering report and cycle triggering report according to triggering type. Each report configuration owns independent ID. Wherein, report configuration of event triggering type will be configured with threshold of certain event and Time of Trigger for meeting triggering condition, that of cycle triggering type will be configured with the purpose for cycle triggering (such as, report CGI). At present, there are totally 5 common frequency/pilot frequency measurement events in LTE system, including Event A1 (Serving becomes better than threshold), Event A2 (Serving becomes worse than threshold), Event A3 (Neighbour becomes offset better than serving), Event A4 (Neighbour becomes better than threshold), Event A5 (Serving becomes worse than threshold 1 and neighbour becomes better than threshold 2);

Measurement ID: independent ID and can be connected to a measurement object and report configuration at the same time. If achieving the threshold for opening measurement, UE will judge whether to conduct the measurement based on measurement ID;

Other parameters may include measurement value configuration, measure open threshold, speed state parameter and others.

In addition, measurement report in LTE system will be triggered in three modes: event trigger report, cycle report and event trigger cycle report. The three modes are distinguished based on combination of various parameters in report configuration.

Figure 3:
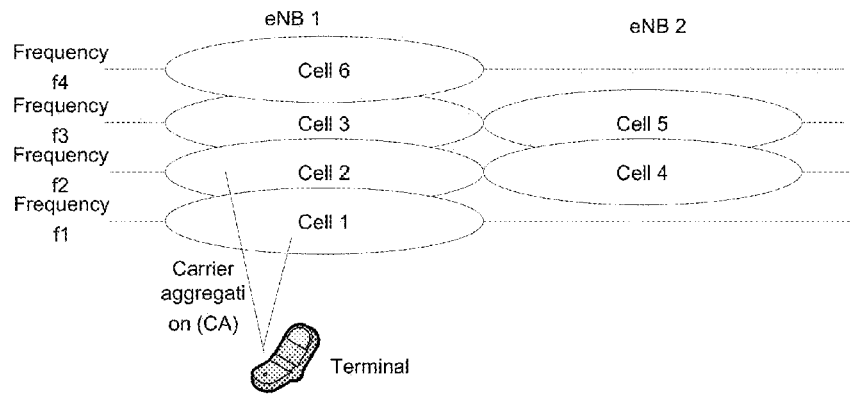
FIG. 3 is a structure diagram of configuration event with network as UE in carrier aggregation system of present technology.

Presently, the following conclusions regarding measurement of carrier aggregation system emerge in international standard meeting:

For each CC in UE configuration (including the activated and unactivated), A1 and A2 events can be configured by network (as shown in FIG. 3, cell 3 is Pcell, cell 1 and cell 2 are Scell and A1 and A2 events are configured for F1 frequency point by network);

For each CC in UE configuration (including the activated and unactivated), A3 event (common frequency A3) can be configured for the frequency point by network and serving cell of the A3 event is Scell at the frequency point configured for UE; neighbor cell can be any other cell at the frequency point (as shown in FIG. 3, A3 event measurement is configured for F2 frequency point by network and serving cell is Scell 2);

Common frequency A5 event is not adopted;

A3/A5 event can be configured for any frequency point by network, serving cell of which is present Pcell of UE and neighbor cell can be any cell at the frequency point (as shown in FIG. 3, A3/A5 event measurement is configured for frequency point F4 not configured by network and serving cell is Pcell 3).

Then we will combine the attached drawings in the embodiments of the present invention to clearly and perfectly describe the technical proposals therein. Obviously, the embodiments said below are only a part of them instead of the whole. Based on the embodiments of the present invention, other embodiments acquired by ordinary technicians of this field on the premise of paying no creative work all belong to the protected scope of the embodiments of the present invention.

Embodiment I

Figure 4:
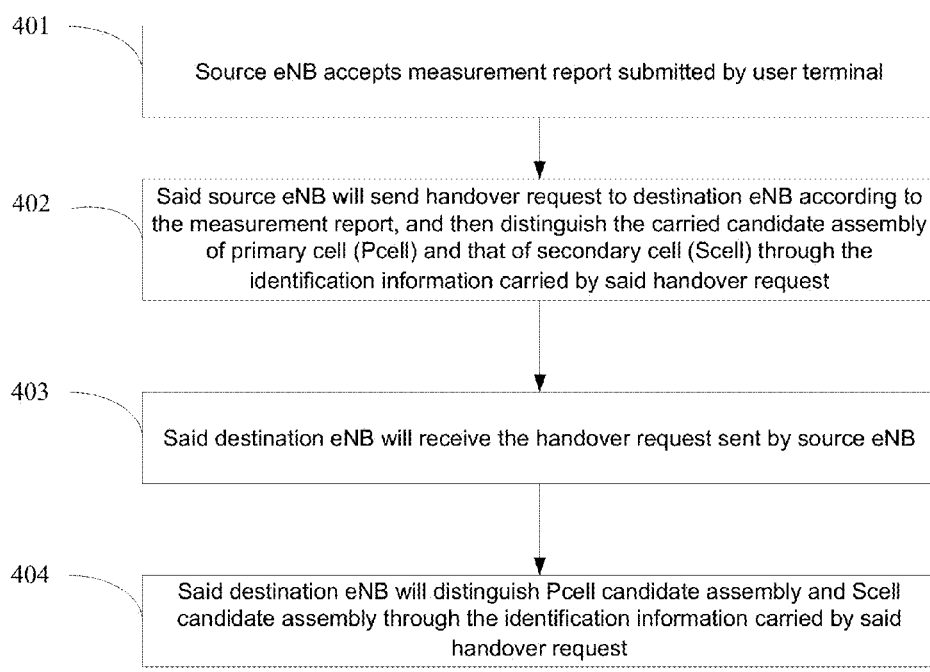
FIG. 4 is a flow diagram of transmission method of handover information provided in Embodiment I of the present invention.

Embodiment I of the present invention provides a method for transmitting handover information, as shown in FIG. 4, including:

Step 401, source eNB receives measurement report submitted by user terminal;

Step 402, said source eNB sends handover request to target eNB according to the said measurement report, and distinguish the carried candidate set of primary cell (Pcell) and secondary cell (Scell) through the identification information carried by said handover request;

Step 403, the said target eNB receives the handover request sent by source eNB;

Step 404, said target eNB distinguishes Pcell candidate set and Scell candidate set through the identification information carried by said handover request;

Wherein, said identification information refers to one of security key information, cell type indication or list type.

Distinguish Pcell candidate set and Scell candidate set carried through the carried identification information in the said handover request as:

When the said identification information is security key information, the source eNB set the security key information as optional; the source eNB set said security key information for Pcell candidate set and Scell candidate set according to the corresponding relation between said security key information and serving cell candidate set. Specifically, the source eNB carries security key information for candidate cell of Pcell and does not carry security key information for candidate cell of Scell; said target cell knows that the cell carrying security key information is Pcell candidate cell and the cell not carrying security key information is Scell candidate cell.

Said source eNB sets said cell type indication for each candidate serving cell when said identification information refers to cell type indication; cell type indication of candidate Pcell and Scell are different;

When said identification information refers to list type, said source eNB carries Pcell and Scell through the lists corresponding to Pcell candidate set and Scell candidate set respectively.

Said target eNB distinguishes Pcell candidate set and Scell candidate set through the identification information carried by said handover request, including:

When said identification information is security key information, said target eNB distinguishes Pcell candidate set and Scell candidate set according to the corresponding relation between said security key information and serving cell candidate set as well as whether serving cell candidate set is set with said security key information;

When said identification information refers to indications of cell type, said target eNB distinguishes each said candidate serving cell to be candidate Pcell or candidate Scell in accordance with cell type indication of each candidate serving cell.

When said identification information refers to list type, said target eNB distinguishes Pcell candidate set and Scell candidate set based on the correspondence between said list type and candidate set of serving cell.

The method further includes:

Said target eNB selects Pcell in said Pcell candidate set and selects Scell in said Pcell candidate set or Scell candidate set.

Embodiment II

Figure 5:
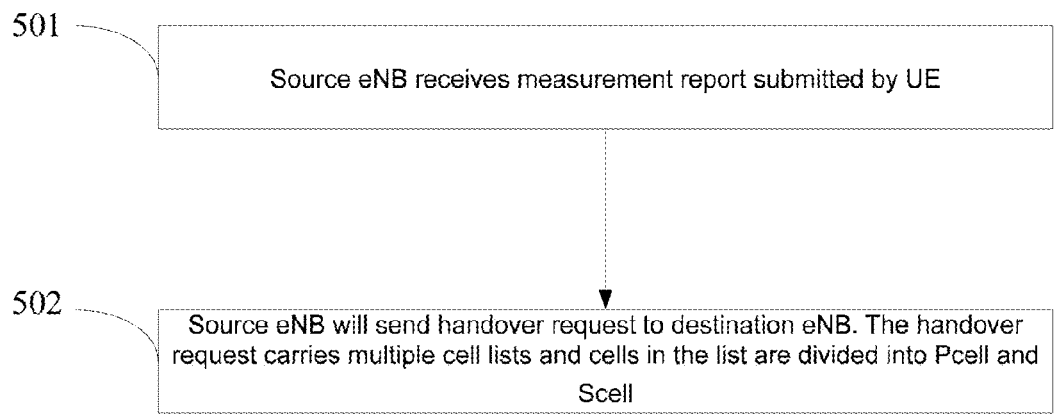
FIG. 5 is a flow diagram of transmission method of handover information provided in Embodiment II of the present invention.

Embodiment II of the present invention provides a method for transmitting handover information, as shown in FIG. 5, including:

Step 501, source eNB receives measurement report submitted by UE.

Step 502, source eNB sends handover request to target eNB. The handover request carries multiple cell lists and cells in the list are divided into Pcell and Scell.

Specifically, cells in list are divided in the following modes:

A. One part of cells serve as dedicated candidate cell set of Pcell and another part of cells are candidate cell set of Scell;

B. The whole set is candidate cell set of Scell; one part of them is candidate cell set of Pcell.

In mode A, Pcell candidate set provided by source eNB is special for target eNB to select Pcell, viz. Scell is not allowed to be selected from the set. Scell candidate set is mutually exclusive to Pcell candidate set. Under this mode, it is supposed that source eNB only selects a few cells of the best quality based on UE measurement report and calculates security key parameter to serve as candidate set of target eNB to Pcell; other cells of low quality and not providing security key will be candidate set of Scell.

While under mode B, Pcell and Scell can share the same candidate set, or not in contrast. The reason is that cell can be selected by Pcell must meet the requirements on selection of Scell, although the security key information provided is excrescent for Scell.

Detailed introduction to division mode of cell in lists is made as below.

The first mode: carrying security key information during handover information;

Specifically, source eNB sets key information in ReestablishmentInfo IE as optional. The key information will emerge only when the cell is used for Pcell candidate. Of course, it can also be set as identifying Scell when emerging the key information. At that moment, specific structure (it is only a specific realization for realizing purpose of the embodiment) of ReestablishmentInfo IE in handover message is shown as below:

```
-- ASN1START
ReestablishmentInfo ::=            SEQUENCE {
    sourcePhysCellId                PhysCellId,
    targetCellShortMAC-I             ShortMAC-I,
    additionalReestabInfoList       AdditionalReestabInfoList
    OPTIONAL,
    ...
}
AdditionalReestabInfoList ::= SEQUENCE  ( SIZE
(1..maxReestabInfo)  ) OF AdditionalReestabInfo
AdditionalReestabInfo ::=SEQUENCE{
    cellIdentity                    CellIdentity,
    key-eNodeB-Star                 Key-eNodeB-Star,
    OPTIONAL
    shortMAC-I                      ShortMAC-I
    OPTIONAL
}
Key-eNodeB-Star ::=                BIT STRING (SIZE (256))
-- ASN1STOP
```

The second mode: carrying cell type indication information in handover message;

Specifically, source eNB expands a bit (recorded as forPcellSelectionIndication) for each cell in cell list of ReestablishmentInfo IE. If the bit is set as 1, it means source eNB provides the cell to target eNB for selection of Pcell. Of course, the bit also can be set as other values to identify cell for selection of Pcell. Furthermore, the bit can also identify cell for selection of Scell. Here we will explain the structure of ReestablishmentInfo IE in this embodiment through a specific ReestablishmentInfo IE structure example in handover message; the example is not used for restricting specific type of handover message.

```
-- ASN1START
ReestablishmentInfo ::=            SEQUENCE {
    sourcePhysCellId                PhysCellId,
    targetCellShortMAC-I             ShortMAC-I,
    additionalReestabInfoList       AdditionalReestabInfoList
    OPTIONAL,
    additionalReestabInfoList-R10   AdditionalReestabInfoList-R10
    OPTIONAL,
    ...
}
AdditionalReestabInfoList-R10 ::=    SEQUENCE ( SIZE
(1..maxReestabInfo) ) OF AdditionalReestabInfo-R10
AdditionalReestabInfo-R10 ::=    SEQUENCE{
    cellIdentity                    CellIdentity,
    key-eNodeB-Star                 Key-eNodeB-Star,
    shortMAC-I                      ShortMAC-I
    forPcellSelectionIndication     BOOLEAN
}
Key-eNodeB-Star ::=                BIT STRING (SIZE (256))
-- ASN1STOP
```

The third mode, carrying list type in handover message;

Specifically, under such mode, key parameter is provided for all cell lists in reestablishment information in LTE, so it is suitable for Pcell selection of target eNB. In this mode, IE of additionalReestabInfoList is still used as candidate set of Pcell. For Scell candidate set for which key parameter is unnecessary, expand an IE in handover message to bear the message. Then specific structure of ReestablishmentInfo IE in handover message is:

```
-- ASN1START
ReestablishmentInfo ::=            SEQUENCE {
    sourcePhysCellId                PhysCellId,
    targetCellShortMAC-I             ShortMAC-I,
    additionalReestabInfoList       AdditionalReestabInfoList
    OPTIONAL,
    scellCandidateCellList          SEQUENCE ( SIZE
(1..maxScellCandidates) ) OF
    CellIdentity,
    ...
}
AdditionalReestabInfoList ::=      SEQUENCE  ( SIZE
(1..maxReestabInfo)  ) OF AdditionalReestabInfo
AdditionalReestabInfo ::=SEQUENCE{
    cellIdentity                    CellIdentity,
    key-eNodeB-Star                 Key-eNodeB-Star,
    shortMAC-I                      ShortMAC-I
}
Key-eNodeB-Star ::=                BIT STRING (SIZE (256))
-- ASN1STOP
```

Here handover of UE between source eNB and target eNB shall be explained by examples.

For example, UE aggregates at the two cells of frequency points F1 and F2 presently, and the cell above F1 refers to Pcell, and that above F2 refers to Scell; moreover, UE measures pilot frequency F3, F4 and F5 based on measurement configuration distributed by source eNB presently. Source eNB has received Cell_3_1 of the best quality and Cell_3_2 of second quality above frequency point F3 submitted by UE, {Cell_4_1, Cell_4_2} and {Cell_5_1, Cell_5_2} of the best and second quality above corresponding frequency points F4 and F5. Source eNB indicates {Cell_3_1, Cell_4_1} candidate cell assemblies of Pcell and {Cell_3_2, Cell_4_2, Cell_5_1, Cell_5_2} are candidate cell set of Scell while sending handover message to target eNB. Target eNB finally selects Cell_3_1 as Pcell after handover and Cell_5_1 as Scell after handover, and transfers them to UE upon handover order.

For example, UE aggregates at the two cells of frequency points F1 and F2 presently, and the cell above F1 refers to Pcell, and that above F2 refers to Scell; moreover, UE measures pilot frequency F3, F4 and F5 based on measurement configuration distributed by source eNB presently. Source eNB has received Cell_3_1 of the best quality and Cell_3_2 of second quality above frequency point F3 submitted by UE, {Cell_4_1, Cell_4_2} and {Cell_5_1, Cell_5_2} of the best and second quality above corresponding frequency points F4 and F5. Source eNB carries candidate cell list {Cell_3_1, Cell_3_2, Cell_4_1, Cell_4_2, Cell_5_1, Cell_5_2} while sending handover message to target eNB and indicates {Cell_3_1, Cell_4_1} are candidate cell set of Pcell. Target eNB finally selects Cell_3_1 as Pcell after handover and Cell_4_1 as Scell after handover, and transfers them to UE upon handover order.

For example, UE aggregates at the two cells of frequency points F1 and F2 presently, and the cell above F1 refers to Pcell, and that above F2 refers to Scell; moreover, UE measures pilot frequency F3, F4 and F5 based on measurement configuration distributed by source eNB presently. Source eNB has received Cell_3_1 of the best quality and Cell_3_2 of second quality above frequency point F3 submitted by UE, {Cell_4_1, Cell_4_2} and {Cell_5_1, Cell_5_2} of the best and second quality above corresponding frequency points F4 and F5. Source eNB carries candidate cell list {Cell_3_1, Cell_3_2, Cell_4_1, Cell_4_2, Cell_5_1, Cell_5_2} while sending handover message to target eNB and indicates {Cell_3_1, Cell_4_1} are candidate cell set of Pcell. Target eNB guesses according to algorithm that Cell_4_3 quality above frequency point F4 is reliable and finally selects Cell_3_1 as Pcell after handover and Cell_4_3 as Scell after handover, and transfers them to UE upon handover order.

The embodiments of the present invention provide a method of selecting indications of Pcell and Scell through handing over information-carried target eNB during multi-carrier handover process, so as to enable the target cell to distinguish Pcell and Scell, and then select corresponding Pcell and Scell according to indications of source cell.

Embodiment III

Figure 6:
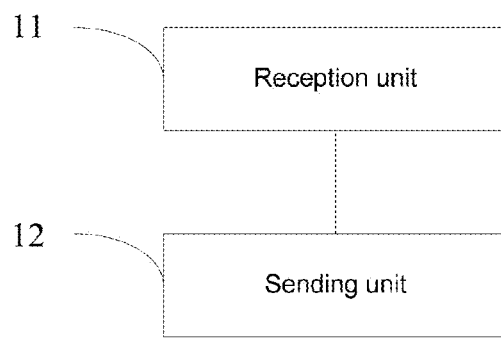
FIG. 6 is a structure diagram of eNB provided in Embodiment III of the present invention.

Founded on the same technological idea with embodiment of method aforesaid, Embodiment III of the present invention provides an eNB, as shown in FIG. 6, including:

Receiving unit 11, is used to receive measurement report submitted by user terminal;

Sending unit 12, is used to send handover request to target eNB based on said measurement report and distinguish Pcell candidate set and Scell candidate set according to identification information carried in said handover message.

Said identification information refers to one of security key information, cell type indication or list type.

Said sending unit 12 is also applicable to:

Set said security key information as optional when said identification information is security key information;

Set said security key information for Pcell candidate set and Scell candidate set according to the corresponding relation between said security key information and serving cell candidate set. Specifically, sending unit 12 carries security key information for candidate cell of Pcell but does not carry it for candidate cell of Scell.

Said sending unit 12 is also applicable to:

Set said cell type indication for each candidate serving cell when said identification information refers to cell type indication; cell type indication of candidate Pcell and Scell are different.

Said sending unit 12 is also applicable to:

When said identification information is list type, carry Pcell and Scell through the lists corresponding to Pcell candidate set and Scell candidate set respectively.

Embodiment IV

Figure 7:
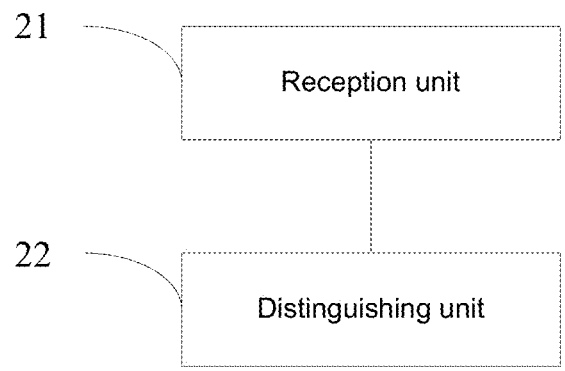
FIG. 7 is a structure diagram of eNB provided in Embodiment IV of the present invention.

Founded on the same technological idea with embodiment of method aforesaid, Embodiment IV of the present invention provides an eNB, as shown in FIG. 7, including:

Reception unit 21, is used to receive the handover request sent by source eNB;

Distinguishing unit 22, is used to distinguish Pcell candidate set and Scell candidate set through the identification information carried by said handover request.

Said identification information refers to one of security key information, cell type indication or list type.

Said distinguishing unit 22 is also applicable to:

When said identification information is security key information, distinguish Pcell candidate set and Scell candidate set according to the corresponding relation between said security key information and serving cell candidate set as well as whether serving cell candidate set is set with said security key information. Specifically, said distinguishing unit 22 knows that the cell carrying security key information is Pcell candidate cell and the cell carrying no security key is Scell candidate cell.

Said distinguishing unit 22 is also applicable to:

When said identification information refers to cell type indication, distinguish each candidate serving cell to be candidate Pcell or candidate Scell in accordance with cell type indication of each candidate serving cell.

Figure 8:
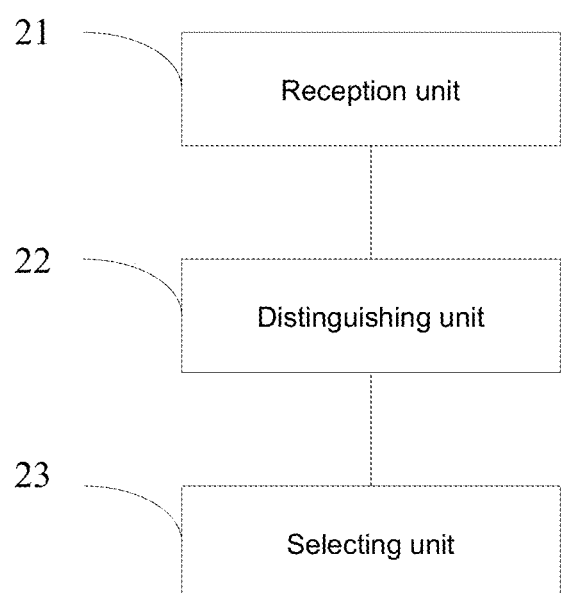
FIG. 8 is another structure diagram of eNB provided in Embodiment IV of the present invention.

Said distinguishing unit 22 is also applicable to:

When said identification information refers to list type, distinguish Pcell candidate set and Scell candidate set based on the correspondence between said list type and candidate set of serving cell.

eNB provided in this embodiment, as shown in FIG. 8, further including:

Selecting unit 23, is used to select Pcell in said Pcell candidate set and Scell in said Pcell candidate set or said Scell candidate set.

Embodiment V

Founded on the same technological idea with embodiment of method aforesaid, Embodiment V of the present invention provides a method for transmitting handover information, including source eNB and target eNB; herein, Said source eNB is used to receive the measurement report submitted by user terminal, send handover request to said target eNB accordingly, and distinguish Pcell candidate set and Scell candidate set through the identification information carried by said handover request;

Said target eNB is used to receive the handover request sent by said source eNB, and distinguish Pcell candidate set and Scell candidate set through the identification information carried by said handover request.

In embodiments of the present invention, source eNB enables target cell to distinguish Pcell and Scell through the method that handover information carries the indication that target eNB selects Pcell and Scell during multicarrier handover to further select corresponding Pcell and Scell based on indication of source cell.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several indications to enable a terminal unit (such as handset, personal computer, server, or network equipment, etc.) to implement the methods said in all embodiments of the present invention.

Only the preferred embodiments of the present invention are mentioned above. It should be pointed out that technical personnel of the technical field can make any improvement and modification which also shall be protected by the present invention.

What is claimed is:

1. A method for transmitting handover information comprising:
    receiving a handover request sent by source eNB (evolved Node-B) at a target eNB;
    said target eNB distinguishes Pcell (primary cell) candidate set and Scell (secondary cell) candidate set through the identification information carried by said handover request.

2. The method as claimed in claim 1 wherein said identification information refers to one of security key information, cell type indication or list type.

3. The method as claimed in claim 2, wherein said target eNB distinguishes Pcell candidate set and Scell candidate set through the identification information carried by said handover request, including:
   when said identification information is security key information, said target eNB distinguishes Pcell candidate set and Scell candidate set according to the corresponding relation between said security key information and serving cell candidate set as well as whether the serving cell candidate set is set with said security key information.

4. The method as claimed in claim 3, wherein said target eNB distinguishes Pcell candidate set and Scell candidate set according to the corresponding relation between said security key information and serving cell candidate set as well as whether the serving cell candidate set is set with said security key information, including:
   said target eNB knows that the cell carrying security key information is Pcell candidate cell and the cell not carrying security key information is Scell candidate cell.

5. The method as claimed in claim 2, wherein said target eNB distinguishes Pcell candidate set and Scell candidate set through the identification information carried by said handover request, including:
   when said identification information refers to indication of cell type, said target eNB distinguishes each said candidate serving cell to be candidate Pcell or candidate Scell in accordance with cell type indication of each candidate serving cell.

6. The method as claimed in claim 2, wherein said target eNB distinguishes Pcell candidate set and Scell candidate set through the identification information carried by said handover request, including:
   when said identification information refers to list type, said target eNB distinguishes Pcell candidate set and Scell candidate set based on the correspondence between said list type and candidate set of serving cell.

7. The method as claimed in claim 1 further comprising:
   said target eNB selects Pcell in said Pcell candidate set and selects Scell in said Pcell candidate set or Scell candidate set.

8. An eNB wherein:
   a reception unit, is used to receive the handover request sent by source eNB; and
   a distinguishing unit, is used to distinguish Pcell candidate set and Scell candidate set through the identification information carried by said handover request.

9. The eNB as claimed in claim 8 wherein said identification information refers to one of security key information, cell type indication or list type.

10. The eNB as claimed in claim 9 wherein said distinguishing unit is also used to:
    when said identification information is security key information, distinguish Pcell candidate set and Scell candidate set according to the corresponding relation between said security key information and serving cell candidate set as well as whether serving cell candidate set is set with said security key information.

11. The eNB as claimed in claim 10 wherein said distinguishing unit is also used to:
    know that the cell carrying security key information is Pcell candidate cell and the cell carrying no security key information is Scell candidate cell.

12. The eNB as claimed in claim 9 wherein said distinguishing unit is also used to:
    when said identification information refers to cell type indication, distinguish each candidate serving cell to be candidate Pcell or candidate Scell in accordance with cell type indication of each candidate serving cell.

13. The eNB as claimed in claim 9 wherein said distinguishing unit is also used to:
    when said identification information refers to list type, distinguish Pcell candidate set and Scell candidate set based on the correspondence between said list type and candidate set of serving cell.

14. The eNB as claimed in claim 8 further comprising:
    a selecting unit used to select Pcell in said Pcell candidate set and Scell in said Pcell candidate set or said Scell candidate set.

15. A system for transmitting handover information comprising a source eNB and a target eNB; wherein,
    said source eNB is used to receive the measurement report submitted by user terminal, send handover request to said target eNB accordingly, and distinguish Pcell candidate set and Scell candidate set through the identification information carried by said handover request; and
    said target eNB is used to receive the handover request sent by source eNB, and distinguish Pcell candidate set and Scell candidate set through the identification information carried by said handover request.

* * * * *

UNITED STATES PATENT AND TRADEMARK OFFICE
CERTIFICATE OF CORRECTION

| | | |
|---|---|---|
| PATENT NO. | : 8,996,009 B2 | Page 1 of 1 |
| APPLICATION NO. | : 13/691749 | |
| DATED | : March 31, 2015 | |
| INVENTOR(S) | : Haitao Li et al. | |

It is certified that error appears in the above-identified patent and that said Letters Patent is hereby corrected as shown below:

ON THE TITLE PAGE

The foreign priority application should be listed as

CHINA Application No. 201010205992.3 Filed June 12, 2010.

Signed and Sealed this
Sixteenth Day of February, 2016

Michelle K. Lee
*Director of the United States Patent and Trademark Office*